(12) United States Patent
Hansen Ellevang et al.

(10) Patent No.: US 9,206,962 B2
(45) Date of Patent: Dec. 8, 2015

(54) LIGHT EFFECT SYSTEM WITH ROTATABLE LIGHT FORMING DEVICE

(75) Inventors: Claus Hansen Ellevang, Hornslet (DK); Carsten Dalsgaard, Silkeborg (DK); Peter Christoffersen Skytte, Brabrand (DK)

(73) Assignee: Martin Professional ApS, Aarhus N. (DK)

( * ) Notice: Subject to any disclaimer, the term of this patent is extended or adjusted under 35 U.S.C. 154(b) by 941 days.

(21) Appl. No.: 13/394,939

(22) PCT Filed: Sep. 10, 2010

(86) PCT No.: PCT/DK2010/050230
§ 371 (c)(1), (2), (4) Date: May 30, 2012

(87) PCT Pub. No.: WO2011/029449
PCT Pub. Date: Mar. 17, 2011

(65) Prior Publication Data
US 2012/0230039 A1    Sep. 13, 2012

(30) Foreign Application Priority Data

Sep. 11, 2009 (DK) .................................. 2009 01015
Feb. 9, 2010 (DK) .................................. 2010 00114

(51) Int. Cl.
*F21V 17/02* (2006.01)
*F21V 14/08* (2006.01)
*F21V 11/18* (2006.01)
(Continued)

(52) U.S. Cl.
CPC ................ *F21V 14/08* (2013.01); *F21V 11/18* (2013.01); *F21S 10/007* (2013.01); *F21V 5/045* (2013.01); *F21W 2131/406* (2013.01); *H01R 39/08* (2013.01)

(58) Field of Classification Search
None
See application file for complete search history.

(56) References Cited

U.S. PATENT DOCUMENTS 4,626,969 A    12/1986    Kristofek
4,729,071 A    3/1988    Solomon
(Continued)

FOREIGN PATENT DOCUMENTS

CN    2509445    9/2002
GB    499221    1/1939
(Continued)

OTHER PUBLICATIONS

Extended European Search Report; Dated: Aug. 5, 2013; European Application No. EP10815017.8, which corresponds to related U.S. Appl. No. 13/394,924; 11 pages.
(Continued)

*Primary Examiner* — Jong-Suk (James) Lee
*Assistant Examiner* — Alexander Garlen
(74) *Attorney, Agent, or Firm* — Blank Rome LLP

(57) ABSTRACT

The present invention relates to a light effect system for forming a light beam. The light effect system comprises a base support rotatable supporting a light effect support and the light effect support comprises light forming means. The light forming means is adapted to form at least a part of said light beam and at least one actuator is adapted to moved the light forming means in relation to said light beam. The light effect system comprises also rotatable electric connecting means enabling transferring of electric energy between the light effect support and said base support during rotation of said light effect support in relation to said base support.

16 Claims, 10 Drawing Sheets

(51) Int. Cl.
 *F21S 10/00* (2006.01)
 *F21W 131/406* (2006.01)
 *F21V 5/04* (2006.01)
 *H01R 39/08* (2006.01)

(56) References Cited

U.S. PATENT DOCUMENTS

| | | | |
|---|---|---|---|
| 5,788,365 A * | 8/1998 | Hunt et al. | 362/301 |
| 2003/0076681 A1 | 4/2003 | Rasmussen et al. | |
| 2006/0072326 A1 | 4/2006 | Rodriquez et al. | |
| 2006/0187654 A1 | 8/2006 | Jungel-Schmid | |

FOREIGN PATENT DOCUMENTS

| | | |
|---|---|---|
| JP | H10255503 | 9/1998 |
| JP | 2008177020 | 7/2008 |
| WO | WO96/36834 | 11/1996 |
| WO | WO0184043 | 11/2001 |
| WO | WO03/023513 | 3/2003 |
| WO | WO2007/134609 | 11/2007 |

OTHER PUBLICATIONS

Extended European Search Report; Dated: Aug. 5, 2013; European Application No. EP10815018.6, which corresponds to this application; 10 pages.
English abstract; Japanese Patent Publication No. JPH10255503; Publication Date: Sep. 25, 1998; 1 page.
English abstract; Japanese Patent Publication No. JP208177020; Publication Date: Jul. 31, 2008; 1 page.
Chinese Search Report; Chinese Application No. 2010800394588; Filing Date: Sep. 10, 2010; 2 pages.
English translation; Chinese Search Report; Chinese Application No. 2010800394588; 2 pages.
First Office Action; English translation; Chinese Application No. 2010800394588; Filing Date: Sep. 10, 2010; 4 pages.
English Abstract; Chinese Application No. CN2509445 Y; 1 page.
International Search Report; International Application No. PCT/DK2010/050229; International Filing Date Sep. 10, 2010; 2 pages.
Danish Search Report; Danish Application No. PA200901015; Filing Date Sep. 11, 2009; 2 pages.
JP2008177020 Patent Abstract; "Light Source Device, Image Display Device, and Projector"; 2 pages.

* cited by examiner

LIGHT EFFECT SYSTEM WITH ROTATABLE LIGHT FORMING DEVICE

FIELD OF THE INVENTION

The present invention relates to a light effect system for forming a light beam and to light fixtures comprising such light effect system.

BACKGROUND OF THE INVENTION

Light effect systems for forming a light beam in order to create various light effects have been known for many years.

Such light effect systems can for instance be a framing systems have a number of shutter blades which can be moved in and out of the light beam by a number of actuators. The light beam is shaped/delimited/framed by adjusting the position of each shutter blade relatively to the light beam and thereby achieving the wanted framing the light beam. The framing systems are typically used in light fixtures such as moving heads, follow spots and spot lights generating a light beam. Such light fixtures comprise a light source generating a light beam and a number of optical components generating different optical effects.

WO9636834, WO03023513, WO07134609, disclose framing systems according to prior art where a number of shutter blades surrounds the light beam and can be moved in and out of the light beam by a number of actuators. The shutter blades and actuators are mounted on a frame support rotatable carried by a base support. These framing systems are used in light fixtures having a light source generating a light beam, a lens system for focusing and/or zooming the light beam and controlling means (CPU; microprocessors, microcontrollers, PLD or the like) for controlling the components of the light fixture. Light fixtures with framing system are often used in connection with stages where a part of the stage or a performer needs to be illuminated. The light beam is framed such that the light beam only illuminates the desired part of the stage or the performer. The light fixtures are typical set up prior to the show by physical positioning the light fixtures and/or by programming the light fixtures through a light controller communicating with the controlling means of the light fixture. This process is often very time-consuming as an operator manually performs the framing of the light beams, especially in huge shows with a large umber of light fixtures. The framing systems can be adjusted in a large variety of patterns as the shutter blades can be moved individually in and out of the light beam and the frame support can also be rotated relative to the light beam. However there are some limitations when framing the light beam as the frame support can only be rotated approximately 45 degrees due to mechanical restrictions around the light beam and the movement of the shutter blades are also limited in there movement. There can thus be some situations where the light fixture can not frame the light beam as desired and the result is that the light fixture needs to be physical moved in order to frame the desired areas, which is very time consuming. This physical movement can in connection with moving heads automatically be performed through the light controller, however this often need rotation of the head and yoke and reprogramming of the light show is thus needed—which is also very time consuming.

WO0184043 discloses a lighting fixture projecting a light beam for spot lighting in theater stages, cinema and television studios and the like. The fixture includes a light source at one end of a housing having a light beam exit aperture at the opposite end thereof, the light source and aperture being arranged generally concentric with a longitudinal or optical axis of the lighting fixture. One or more beam-shaping blades and preferably also other light beam influencing elements, such as one or more lenses, an iris, and/or a pattern or gobo, are arranged along the path of the light beam along the longitudinal axis through the housing from the light source to the aperture. The position of the beam-shaping blade or blades, and preferably of all the light beam influencing elements, is adjustable relative to the longitudinal axis. The fixture produces a well-defined light beam or light cone with a geometry, angle of conicity and focal point that may be altered manually or by remote control. A number of adjustment rings surrounds the light fixture and interacts with the shutter blades through a complicated mechanical system. The shutter blades can be moved in and out of the light beam by rotating the adjustment rings. The disclosed beam-shaping device are very complicated to construct as each shutter blade comprises a large number of components which need to interact in order to shape the light beam using the adjustment rings. This beam-shaping device takes further up a lot of space and it is impossible to integrate inside a light fixture as the adjustment rings need to be positioned outside the housing.

EP1898145 discloses moving head projectors comprising a base, to which base a yoke is rotationally connected, which yoke is rotationally connected to a head, which head comprises a light source placed partly inside reflective means, which reflective means forms a light beam, which light beam passes through light forming means, which light beam furthermore passes through at least one lens before the light beam leaves the projector. This illumination device comprises a number of light forming means in form of GOBOs shaping the light and color filters for coloring the light beam.

WO07098764 discloses a lens system comprising at least one lens, which lens system primarily applies for use in a light assembly comprising at least one light source, which generates a beam of light into light forming means and further through a front lens, characterized in that the lens system comprises at least one supplementary optical component, which supplementary optical component is moved in or out of the light beam by first actuating means, which first actuating means moves the supplementary optical component in a rotating movement around an axis for rotation from a first position outside the light beam into a second position in the light beam, which axis for rotation has a direction mostly perpendicular to the light beam. The Lens system can be change between operation modes automatically by activating or deactivating activation means so as to change the performance of a light fixture.

U.S. Pat. No. 6,971,770 discloses a lighting apparatus including an effect wheel which is mounted on a rotation mechanism. The rotation mechanism is mounted on a mechanism which moves the effect wheel from a position outside of the light path to a position in which the effect wheel intersects the light path to provide a continuous wheel effect. The translation mechanism can move the effect wheel between positions in which the effect wheel crosses the light path in a horizontal direction and in a vertical direction, respectively. The apparatus allows a continuous wheel effect to be added to a multi-purpose luminaire and also allows the direction of travel of the continuous wheel effect across the illuminated field to be continuously varied.

EP 1 516 14 discloses an apparatus for shaping a light beam in a lighting device, comprising a planar occluding element arranged in a plane generally orthogonal to the axis of the light beam and a support disc disposed parallel to the occluding element, wherein the occluding element is rotatable mounted on the support disc for rotation about a first axis, parallel to the axis of the light beam and movable in a path offset from the axis of the light beam and wherein the support disc is rotatable about the axis of the light beam to move the first axis in a circular orbit about the axis of the light beam.

US2010/0103677 discloses a theatre lighting apparatus comprising a base, a communications port, a processor, a memory, and a lamp housing. The lamp housing includes a lamp, a reflector, an output lens, a motor, and a homogenizing lens. The homogenizing lens comprises of a plurality of radically arranged lenticular lenses and a processor is programmed to enable a motor to vary a position of the homogenizing lens in relation to a position of the output lens. The homogenizing lens may be comprised of a first half and a second half, each of which may have a plurality of radically arranged lenticular lenses. The lightning apparatus comprises also a prism apparatus positioned between the light source and the output lens. The prism apparatus is constructed of a plurality of prisms mounted to a substrate in operation incoming light rays shown passes through the substrate and through the base of each prism where a first portion of light rays is refracted into a first direction exiting from one side of the prisms, and a second portion of light rays is refracted into a second direction exiting from another side of the prism. The prism apparatus is attached to a rotation motor capable of rotating the prism apparatus about its center and the prism apparatus and rotation motor are attached to a lead screw and driving motor 606 so the prism apparatus can be transitioned into a light beam. The combination of the prism apparatus and a polymer fresnel front lens results in two substantially separate exiting beams of light (referred to as twin beams). The prism apparatus is also connected to a displacement motor capable of displacing he prism apparatus in relation the front lens can also be moved the angular deviation of the two separate beams of light can hereby be controlled. The twin beams are of each other, since they primarily are created by the prism apparatus and the characteristics (e.g. intensity, color, divergence, size) of the twin beam can thus substantially the same and cannot be controlled independently.

The market for entertainment lighting is often driven by the number of features and effects which the lighting devices are cable of providing and light designers often want to create special and spectacular shows and there is thus a need for new light effects.

Description of the Invention

The object of the present invention is to provide a new and innovative light effects system which can be used in various illumination devices. This is achieved by a light effect system system, light fixture and method as described in the independent claims. The dependent claims describe possible embodiments of the present invention. The advantages and benefits of the present invention are described in the detailed description of the invention.

DETAILED DESCRIPTION OF THE INVENTION

The present invention is in FIG. 1-FIG. 7 described in view of a framing system for shaping a light beam, however other type of light effect systems is illustrated in FIG. 8-11 and the skilled person realize that the light effect system according to the present invention can be embodied with a large variety of light effects.

Figure 1:
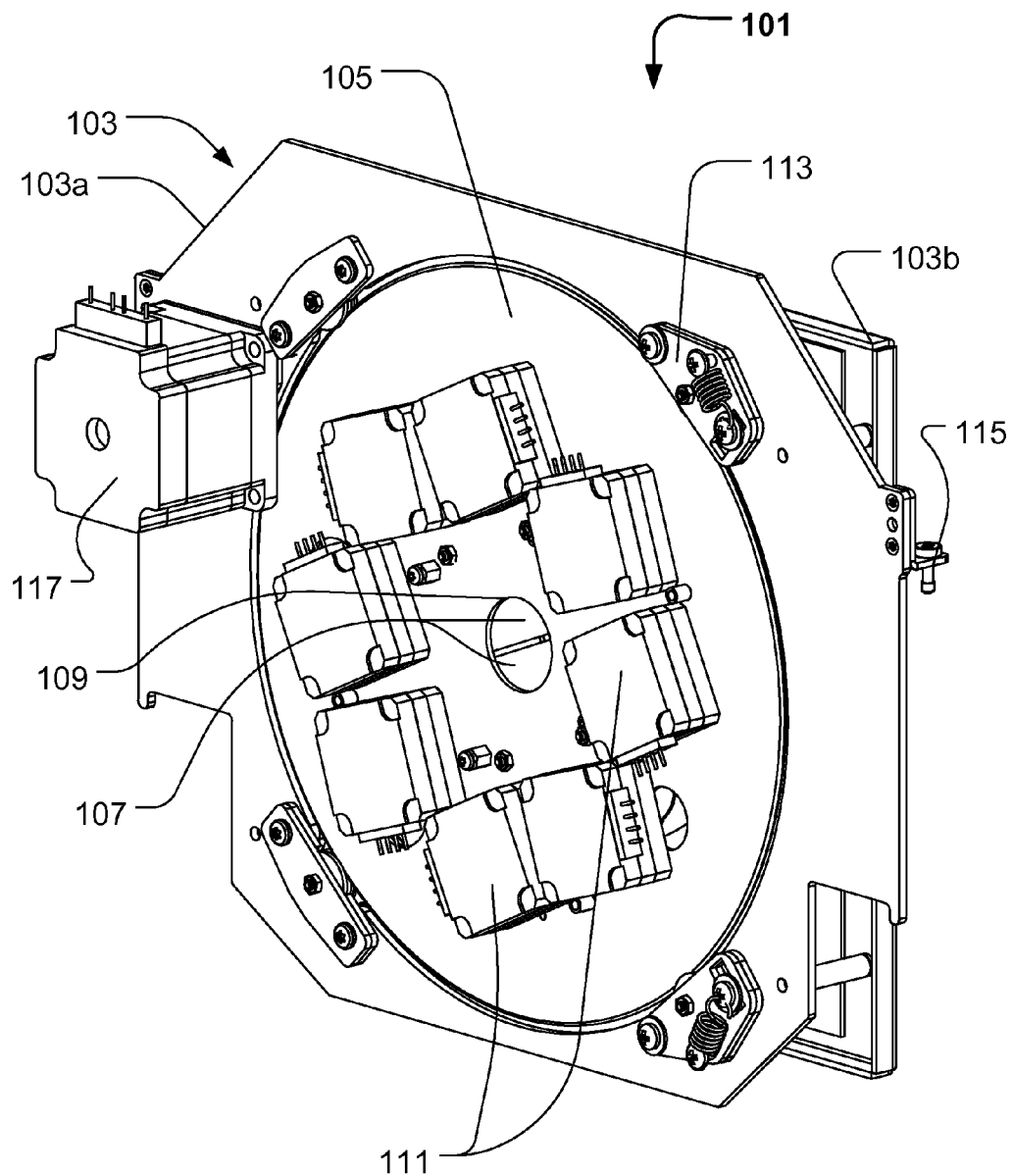
FIG. 1 illustrates a perspective view of a light effect system according to the present invention and comprising a framing system.

FIG. 1 illustrates a perspective view of a framing system 101 according to the present invention. The framing system 101 comprises a base support 103 rotatable supporting a frame support 105. The frame support comprises, a number of shutter blades 107 surrounding an aperture 109 for a light beam (not shown) and a number of actuators 111 adapted to moved the shutter blades in and out of the aperture 109 and thus also in and out of the light beam the light beam.

The base support comprises a first support plate 103a and a second support plate 103b. The first support plate comprising a number of pulley systems 113 rotatable carrying the frame support 105, hinging means 115 for mounting the framing system in a light fixture, and an actuator 117 intermeshing with the frame support.

The shutter blades 107 and actuators 109 can be embodied as known in the prior art for instance as described in WO9636834, WO03023513, WO07134609 incorporated herein by reference. The shutter blades can also be embodied as described in the applicants pending application DK PA 2010 00034 also incorporated by reference. The shutter blades can for instance, as described in WO07134609 or DK PA 2010 00034, be a merged pile, where the shutter blades in the merged pile are placed with the front area placed over the front area of a first neighboring shutter blade and the front area placed below the front area of the second neighboring shutter blade. Forming the shutter means in a merged pile leads to a very thin assembly, where the operating edges of the shutters are operating in the same plane. This can lead to a uniform sharp limitation of a projected light beam. In a projector, the thin assembly can be placed physically close to further light forming means, which also has to operate near an optical focus plane. The framing system according to the present invention are useful in connection with shutter blades merged in a pile as this kind of shutter blades are limited in their movements due the merging and the 360 degrees rotation (described below) of the framing system is eliminates these limitations.

Figure 2:
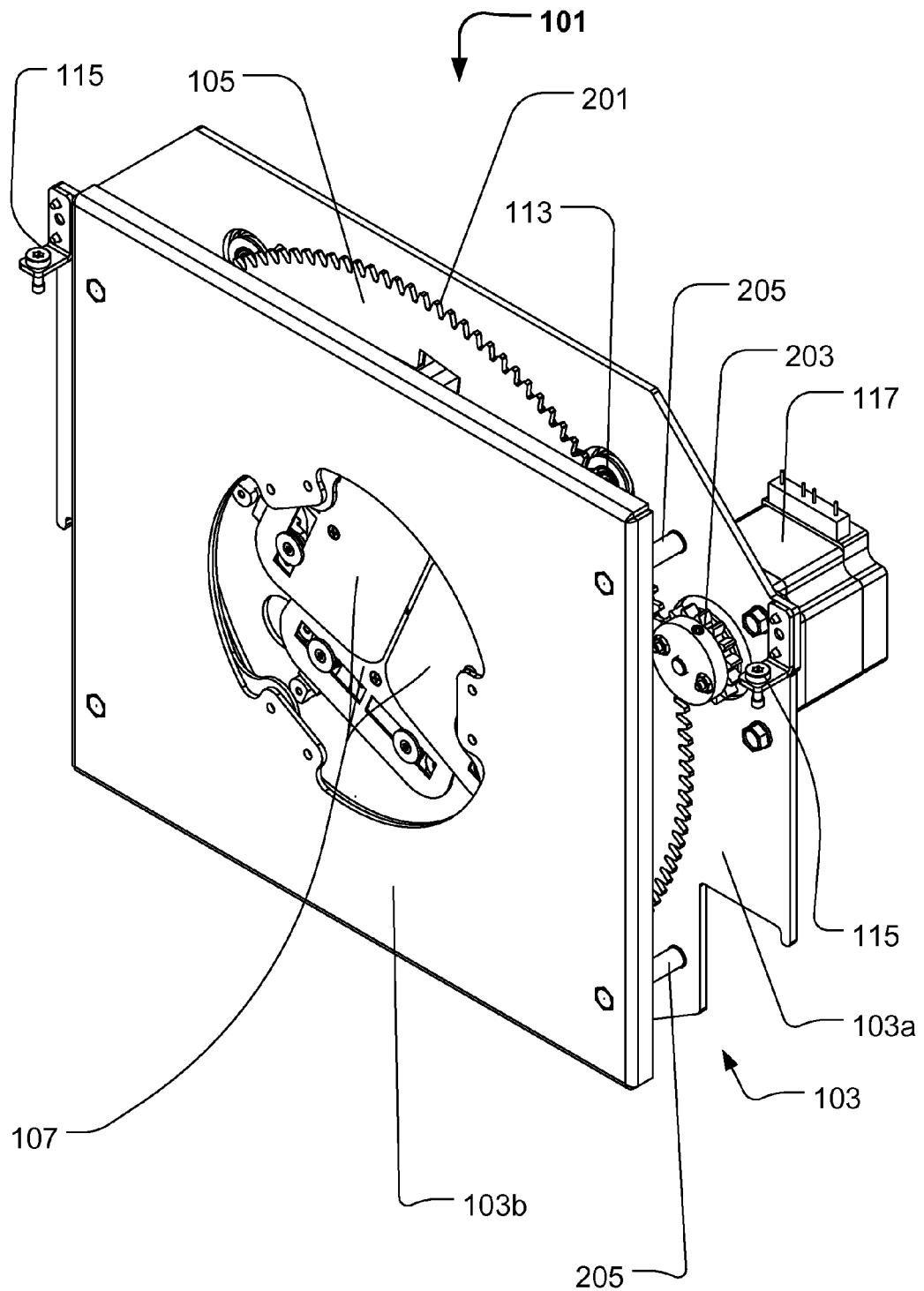
FIG. 2 illustrates a perspective view of the light effect system in FIG. 1 from the opposite side.

FIG. 2 illustrates a perspective view of the framing system in FIG. 1 from the opposite side and illustrates that the framing support 105 comprises a toothed edge 201 intermeshing with a toothed wheel 203 rotatable by actuator 117. The toothed edge 201 is distributed 360 degrees around the frame support and actuator 117 can thus continuously/endless rotate the framing support more than 360 degrees around the light beam. FIG. 2 further illustrates that the first support plate 103a and the second support plate 103b are connected and separated by a number of spacers 205 and that the framing support 105 is positioned between the first and second support plates.

Figure 3:
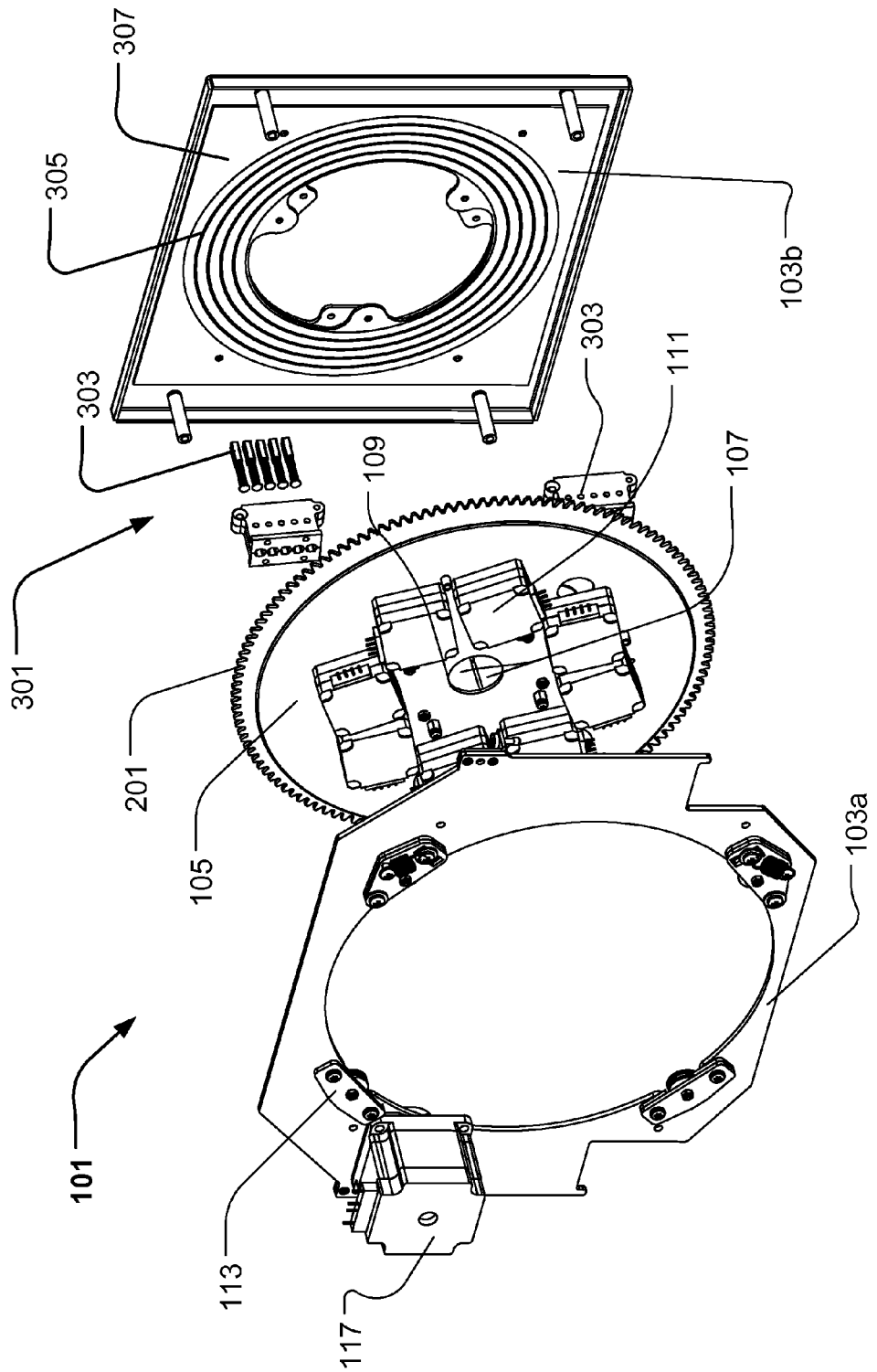
FIG. 3 illustrates a perspective and exploded view of the light effect system in FIG. 1.
Figure 4:
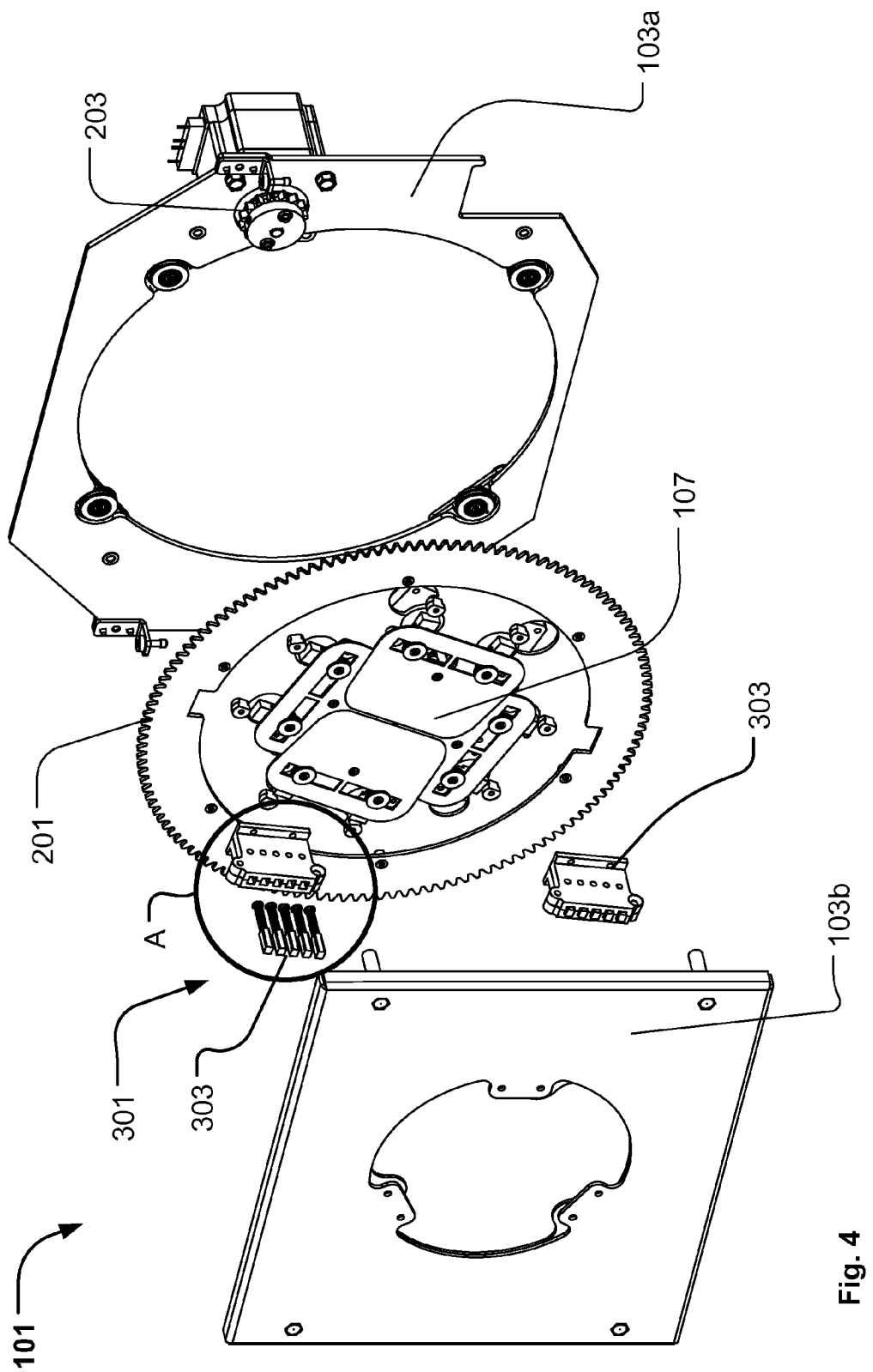
FIG. 4 illustrates a perspective and exploded view of the light effect system in FIG. 2.

FIGS. 3 and 4 illustrate an exploded view of the framing system in FIG. 1 and FIG. 2 respectively. FIG. 3 illustrates that the framing system comprises rotatable electric connecting means 301. The rotatable electric connecting means enables transferring of electric energy between the frame support 105 and the base support 103 during rotation of the support frame in relation the base support. The result is that power signals and control signals can be transferred to the actuators 111 while the frame support 105 rotates. The shutter blades can thus be moved in and out the aperture 109 and adjust the shape of the light beam. The frame support can be rotated more than 360 degrees around the light beam and adjust the shape of the beam into as desired. The limitations, in prior art framing systems, related to framing objects on a stage without the need to physical move the light fixture and/or reprogram the light controller are thus solved, as the framing support can be continuously moved around the light beam and the shutter blades can frame/shape the light beam as wanted. There are no need to consider the physical position of the light fixture, as the framing support can rotate continuously/endless around the light beam. A further surprising effect is the fact that the shape of the light beam can be adjusted while rotating the frame support and the result is that it is possible to create a varying beam shape that rotates continuously around its own axis. This makes it possible to create a new kind of light effect. It is further possible to construct a very compact framing system, since the actuators and shutter blades can be embodied in one plane, this is very useful in connection with light fixtures such as moving head light fixtures and spotlights including other parts for light effects. For instance a compact framing system makes it possible to place a traditional gobo wheel in close proximity to the shutter blades which enables a sharp image imaging of both the shutter blades and the gobo.

The rotatable electric connecting means comprises in the illustrated embodiment a number of one slip rings comprise a contact 303 and an electric conducting track 305. The electric conducting track are embodied on a printed circuit board (PCB) 307 secured to the second base support 103b and the contacts are secured to the frame support and connected to a PCB board on the frame support (not shown). The contacts are aligned with the electrical conducting tracks and adapted to be in contact with the tracks when the frame plate is positioned between the first and second support plates. As a consequence an electric connection between the track and the contact is established. The electrical conducting track surrounds the light beam and the contact will move along the track when the frame support rotates in relation to the base support.

The electrical conducting tracks can for instance be made of an electrical conducting metal, such as cobber where a hard metal have been added on top of the cobber track by soldering, plating or gilding process. The hard metal makes the electrical conducting track more robust against wear and corrosion and could for instance be hard metal such as gold, rhodium or platinum. The described solutions are only examples and the skilled person will be able to construct a large variety of electrical conduction tracks.

Figure 5:
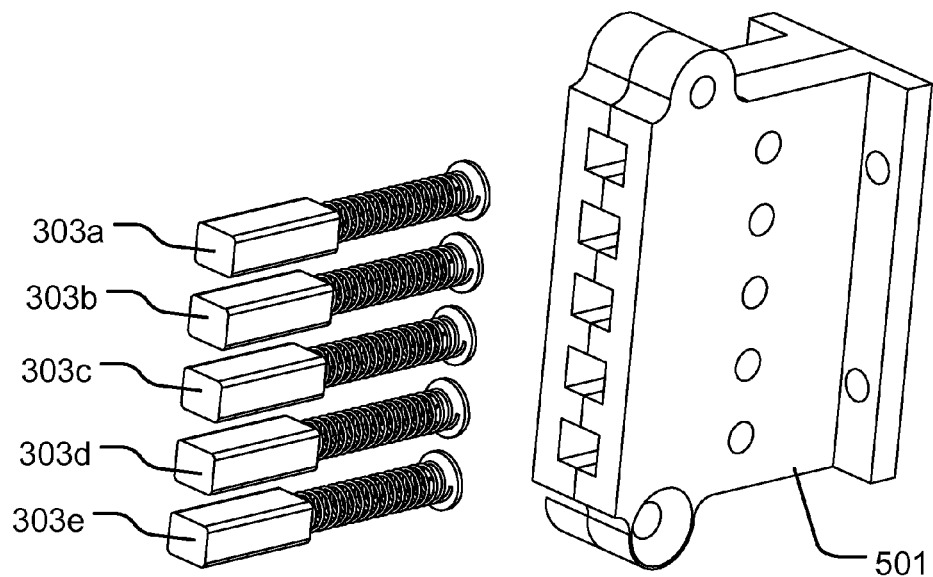
FIG. 5 illustrates an enlarge view of detail A of FIG. 4.

FIG. 5 illustrates an enlarged view of detail A in FIG. 4 and illustrates that five contacts 303a, 303b, 303c, 303d, 303e are placed in a housing 501. The housing is connected to a PCB board on the frame support and each contact is connected to one of the electrical conducting tracks on the base support. The shown framing system comprises two housing such that there are two contacts for each electrical conduction track this improves the contact and does further balance the frame support. However the skilled person realizes the amount of contacts pr. track can be any number ranging from a single contact pr. tract to a large number of contacts. Four contacts pr. track can for instance be positioned symmetrical around the light beam resulting in a very balanced frame support.

Figure 6:
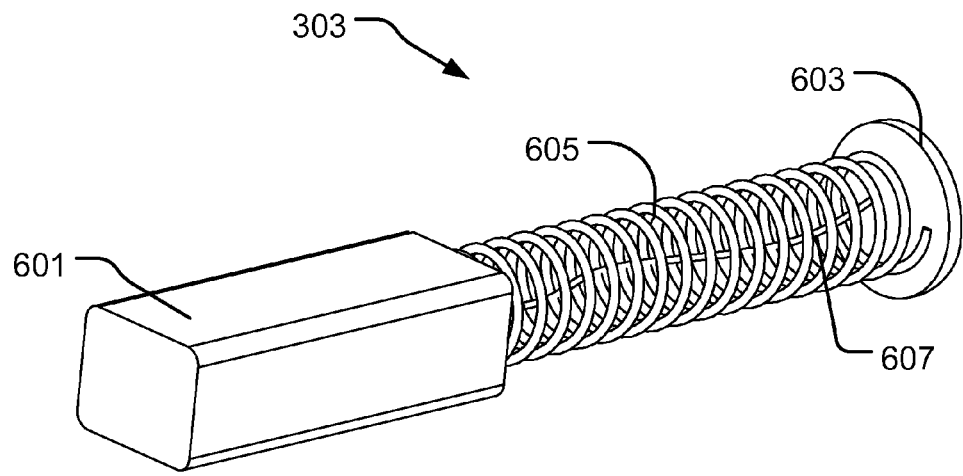
FIG. 6 illustrates a possible embodiment of a slip ring contact.

FIG. 6 illustrates a single contact 303 and illustrates that the contact comprises a contact head 601, a contact end 603, tensioning means 605 and a wire 607. The tensioning means is embodied as a spring and pushes the contact head 601 towards the electrical conducting track. The tensioning means ensures that the contact head always will be in contact with the track even if the contact head by time gets worn out due to friction between the contact head and the track. The electric energy is transmitted from the contact head 601 to the contact end 605 through the wire. The contact end is in connection with conducting tracks on a PCB board on the frame support and the electric energy is distributed to the correct elements on the frame support. The contact head can be made of a soft material, such as a mixture of carbon and silver, in order to reduce wear of the electrical conducting track and friction between the track and contact.

Figures 7A, 7B:
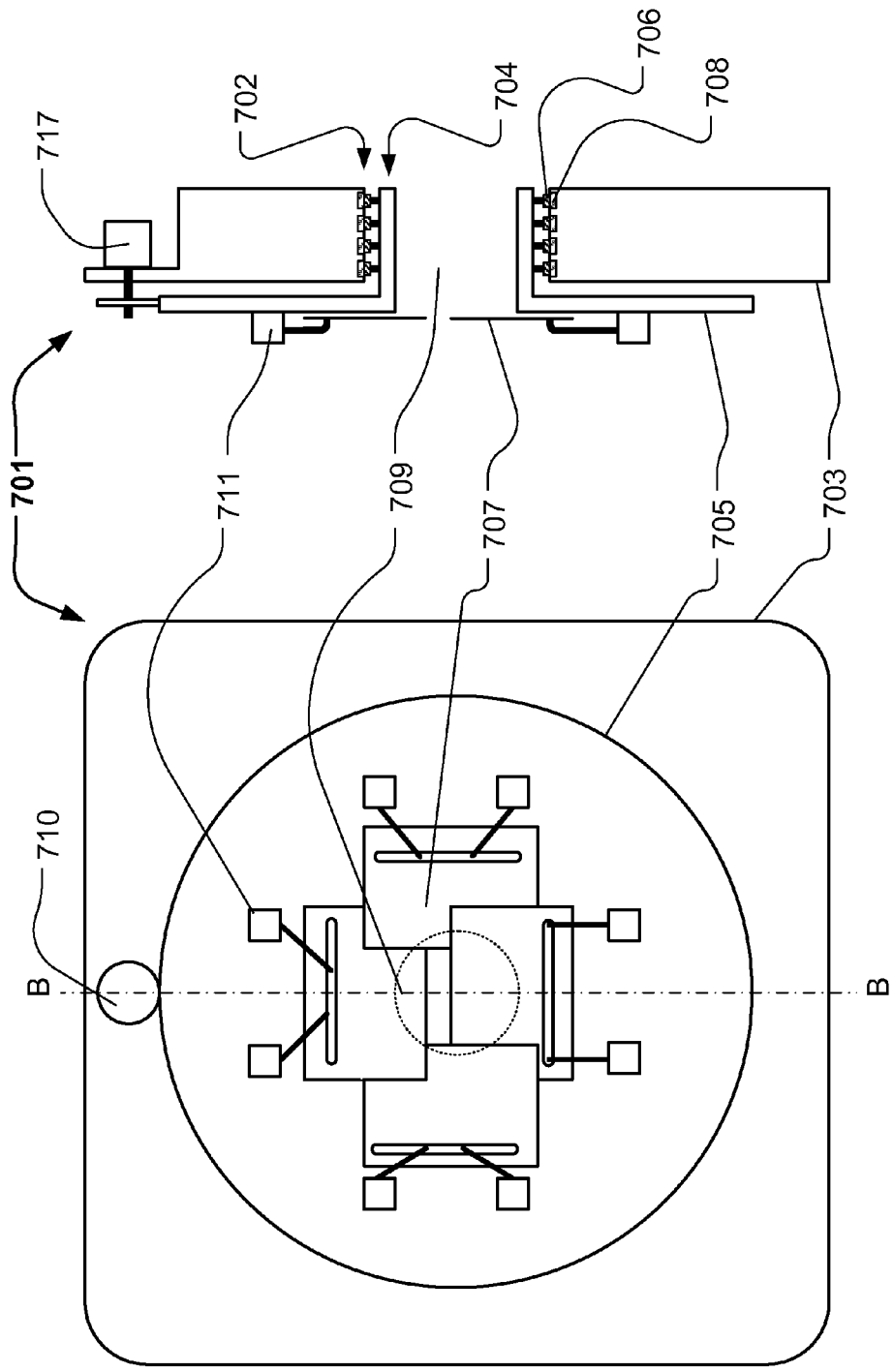
FIG. 7 illustrates another embodiment of the light effect system according to the present invention.

FIG. 7 illustrates another embodiment of the framing system, where FIG. 7a illustrates a top view and FIG. 7b a cross sectional view along line B-B. The framing system 701 comprises a base support 703 rotatable supporting a frame support 705. The frame support comprises, a number of shutter blades 707 surrounding an aperture 709 for a light beam and a number of actuators 711 adapted to moved the shutter blades in and out of the aperture 709.

The frame support 705 can rotate more the 360 degrees in relation to the base support 703 and actuator 717 intermeshes with the frame support through a gearing mechanism 710 and can the perform the rotation of the frame support. The shutter blades 107 and actuators 109 can be embodied as known in the prior art and are merged in a pile as described above.

The rotatable electric connecting means are in this embodiment a number of slip rings. The electric conducting tracks are in this embodiment positioned inside the aperture on a cylindrical surface 702 and the contact are positioned on a accommodating cylindrical surface 704 on the frame support. The contacts 706 and electrical conducting track 708 interacts as described above.

The rotatable electric connecting means can also be embodied as a rotatable transformer transferring the electric energy using inductance. Wear and friction of such connection is reduced compared to the slip rings, as there do need to be a physical contact between the stationary part (base support) and the rotating part (frame support).

Figure 8:
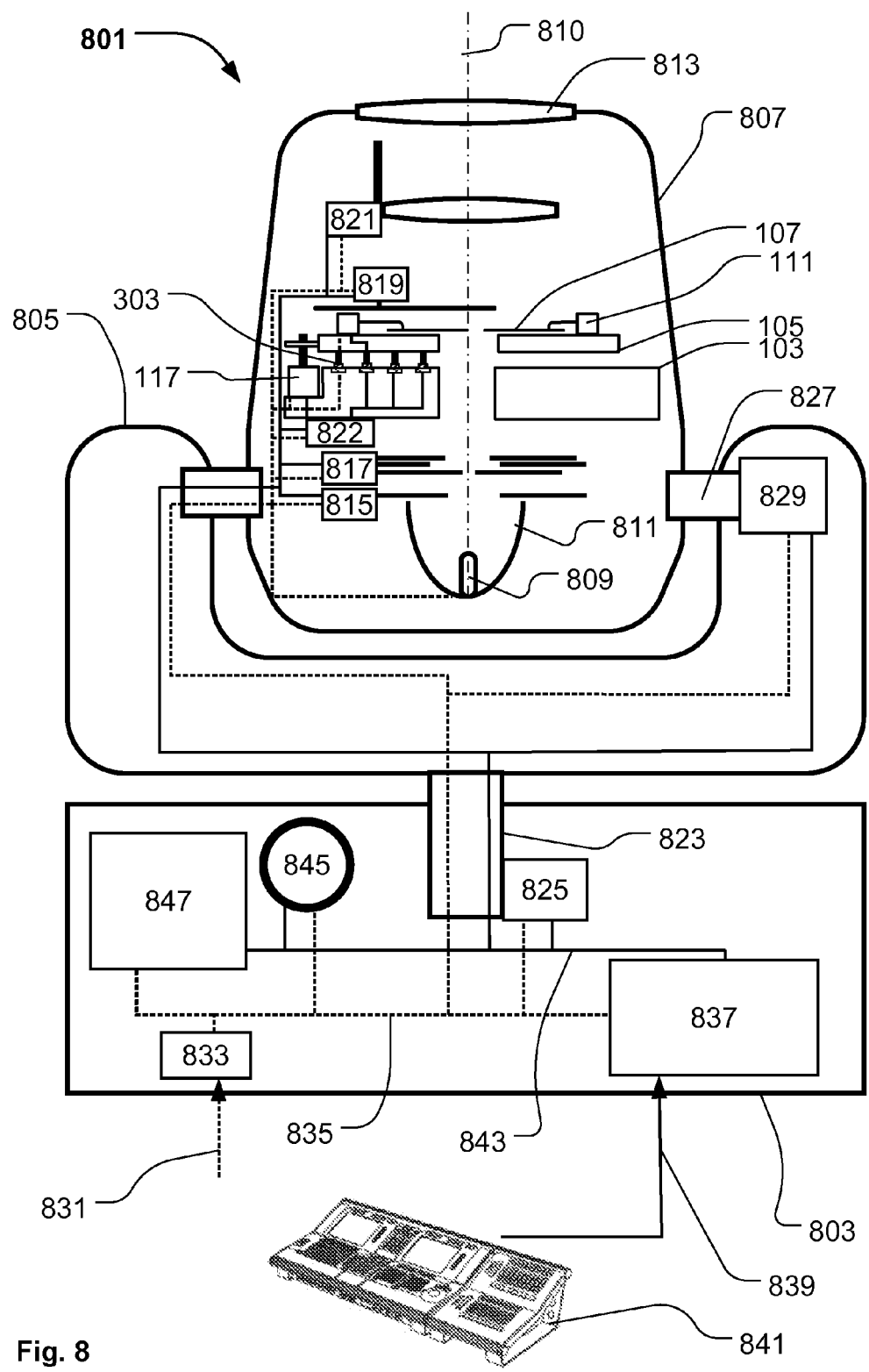
FIG. 8 illustrates a moving head light fixture comprising a light effect system according to the present invention.

FIG. 8 is a structural diagram illustrating a moving head light fixture 801 according to the present invention. The moving head light fixture 801 comprises a base 803 connected to a yoke 805 and a head 807 carried in the yoke. The head comprises at least one light source 809 which generates a light beam (not shown) propagating along an optical axis 810. The light beam is reflected by a reflector 811 and passes through a number of light effects before exiting the head through a lens 813. The light effects can for instance be any light effects known in the art of intelligent lighting for instance a dimmer 815, a CMY color mixing system 817, color filters (not shown), gobos 819 and/or a zoom system 821.

The light effect can also be a framing system according to the present invention. The framing system comprises a base support 103 rotatable supporting a frame support 105 and an actuator 117 adapted to rotate the frame support. The frame support comprises a number of shutter blades 107 surrounding an aperture, through which the light beam passes. A number of actuators 111 are adapted to move the shutter blades in and out of the aperture and thus also in and out of the light beam the light beam. The framing system comprises also controlling means 822 adapted to control the framing system based on a received control signal as described below. The framing system comprises also a number of rotatable electric connecting means 303 for transferring power and controls signals from the base support to the frame support.

The light source can be any known light sources e.g. discharge lamps, LEDs, OLEDS, plasma lamps, lasers etc. The reflector can be any kind of reflectors and in some applications also be embodies as optical lenses such as TIR lenses.

The moving head light fixture comprises first rotating means for rotating the yoke in relation to the base, for instance by rotating a shaft 823 connected to the yoke by using a motor 825 positioned in the base. The moving head light fixture comprises also second rotating means for rotating the head in relation to the yoke, for instance by rotating a shaft 827 connected to the head by using a motor 829 positioned in the yoke. The skilled person realizes that the rotation means can be constructed in many different ways using mechanical components such as motors, shafts, gears, cables, chains, transmission systems etc.

The moving head light fixture receives electrical power 831 from an external power supply (not shown). The electrical power is received by an internal power supply 833 which adapts and distributes electrical power through internal power lines 835 (dotted lines) to the subsystems of the moving head. The internal power system can be constructed in many different ways and the illustrated power lines is for simplicity illustrated as one system where all subsystems are connected to the same power line. However the skilled person will realize that some of subsystems in the moving head need different kind of power and that a ground line also can be used. The light source will for instance in most applications need a different kind of power than step motors and driver circuits.

The light fixture comprises also a controller 837 which controls the other components (other subsystems) in the light fixture based on an input signal 839 indicative of at least one light effect parameter and at least one position parameter. The controller receives the input signal from a light controller 841 as known in the art of intelligent and entertainment lighting for instance by using a standard protocol like DMX, ArtNET, RDM etc. The light effect parameter is indicative of at least one light effect parameter of said light beam for instance the amount of dimming and/or the dimming speed of the light beam, a color that the CMY system 817 should mix, the kind of color filter that a color filter system (not shown) should position in the light beam and/or the kind of gobo that the gobo system 819 should position in the light beam, the divergence of the light beam that light fixture should create using a zoom system 821, a focus distance that indicate the distance form the lens to a surface where a gobo effect should be imaged, etc.

The light effect parameter can also be indicative of how the framing system should frame the light beam and can therefore comprises information of how each shutter blade should move in relation to the light beam, how the frame support should be rotated in relation the base support. The controller 837 receives the light parameter and sends commands to the controlling means 822 adapted to control the framing system. The controlling means 822 adapted to control the framing system will then instruct the actuators to activate the relevant parts as instructed and the descried framing effect is achieved.

The controller is adapted to send commands and instructions to the different subsystems of the moving head through internal communication lines 843 (solid lines). The internal communication system can be based on a various type of communications networks/systems and the illustrated communication system is just one illustrating example.

The position parameter is indicative of rotation of at least said yoke in relation to said base and/or rotation of said head in relation to said yoke. The position parameter can for instance indicate a position whereto the light fixture should direct the beam, the position of the yoke in relation to the base, the position of the head in relation to the yoke, the distance/angle that the yoke should be turned in relation to the base, the distance/angle that the head should be turned in relation the base etc. The rotation parameter can also indicate the speed and time of the rotation.

The moving head can also have user input means enabling a user to interact directly with the moving head instead of using a light controller 841 to communicate with the moving head. The user input means 845 can for instance be bottoms, joysticks, touch pads, keyboard, mouse etc. The user input means can also be supported by a display 847 enabling the user to interact with the moving head through menu system shown on the display using the user input means 847. The display device and user input means can in one embodiment also be integrated as a touch screen.

The present invention relates also to a method for delimiting a light beam using a framing system comprises a base support rotatable supporting a frame support, where the frame support comprises a number of shutter blades surrounding said light beam and a number of actuators adapted to moved said shutter blades in and out of said light beam.

The method comprises the step of:
  moving at least one of said shutter blade in and out of said light beam using said actuator;
  rotating the shutter blades around blade around said light beam by rotating said frame support,
where the step of rotating the shutter blade around the light beam comprises the steps of rotating the frame support at least 360 degrees and transferring electric energy between said frame support and said base support. It is hereby achieved that several light effects can be created as the shape of the light beam can be changes and continuously/endless rotated.

The present invention has above been disclosed in connection with a framing system. However it is to be understood that any kind of light forming means which can be moved in relation to the light beam by an actuator can by used instead of the framing module. It is understood that the light forming means can be any means which can manipulated at least a part of the light beam. For instance:
  gobo as known in the art of entertainment lighting;
  optical means like prism, lenses, Fresnel lenses which refract at least the light beam;
  color filters or CMY flags;
  textured glasses;
  DMDs' or DLP;
  LCDs;
  diffusing screens.

The light forming means can also be a number of additional light sources which can be moved in relation to the light beam by the actuator.

Figure 9:
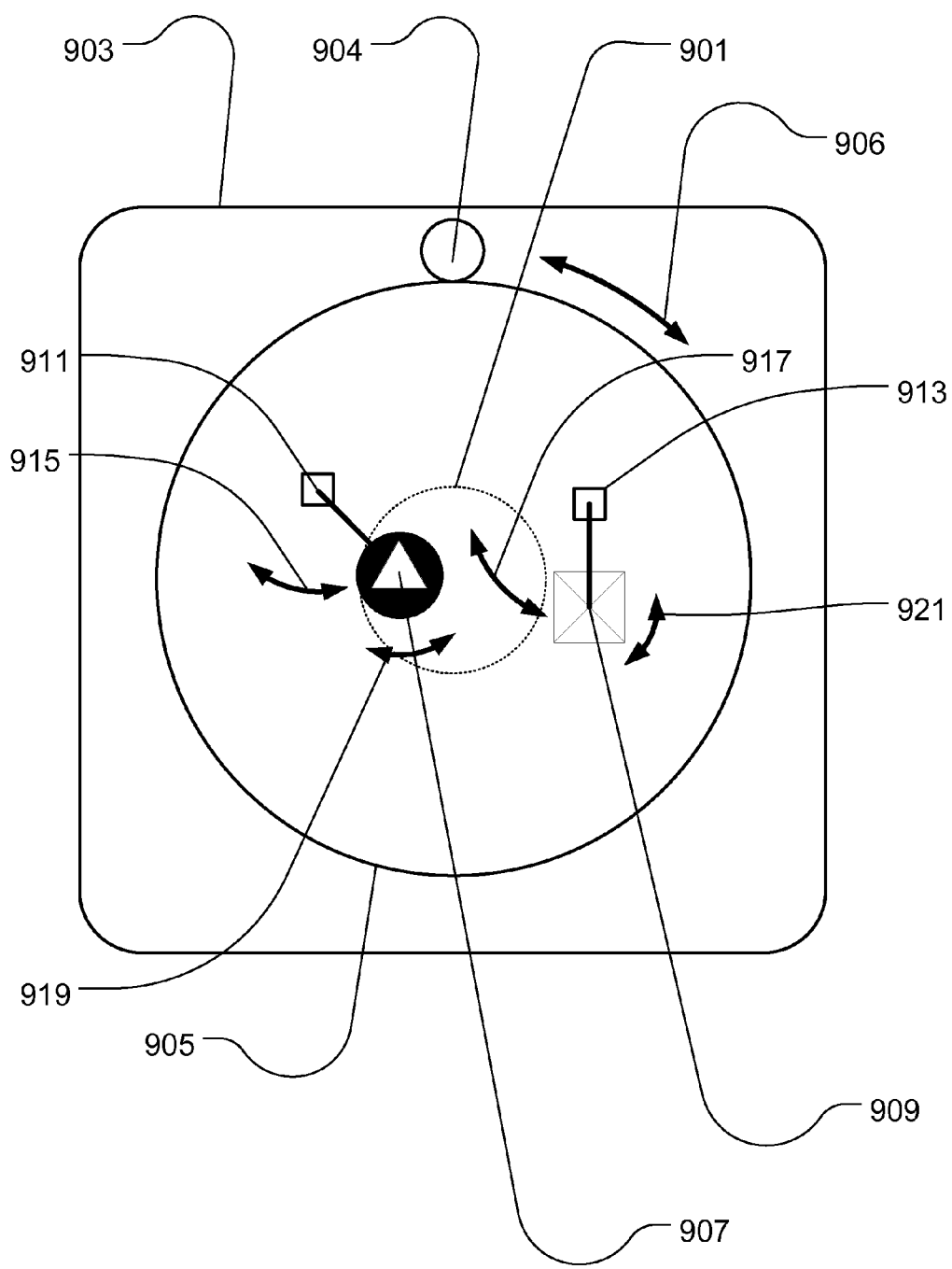
FIG. 9, FIG. 10 and FIG. 11 illustrate other embodiments of light effect system according to the present invention.

FIG. 9 illustrates a light effect system for forming a light beam 901. The light effect system comprises a base support 903 rotatable supporting a light effect support 905. The light effect support 905 can be rotated in relation the base support as indicated by arrow 906. For instance by using a gear connection 904 connected to an actuator. The light effect support comprises light forming means 907 and 909 that can manipulate at least a part of the light beam 901 passing through the an aperture in the base support and the light effect support. Actuators 911 and 913 are adapted to move the light forming means 907 and 909 respectively in relation the light beam as indicated by arrow 915 and 917. Light forming means 907 is illustrated as a gobo and light forming means 909 is a prism reflecting a part of the light beam. It is to be understood that the light forming means can be any kind as mentioned above. The gobo 907 and prism can further be rotated around a rotational axis as indicated by arrows 919 and 921 for instance by using a belt mechanism similar to the one driving the effect wheel disclosed in U.S. Pat. No. 6,971,770. The rotational axis is moved in relation to the light beam by actuators 911 and 913. The light effect system comprises rotatable electric connecting means as describe in connection with the framing system of FIG. 1-7. The rotatable electric connecting enables transferring of electric energy between the light effect support and the base support during rotation of the light effect support in relation to the base support. The light forming means can thus be rotated inside the light beam 901 and further be rotated around the light beam 901 which creates new and innovative light effects.

Figure 10:
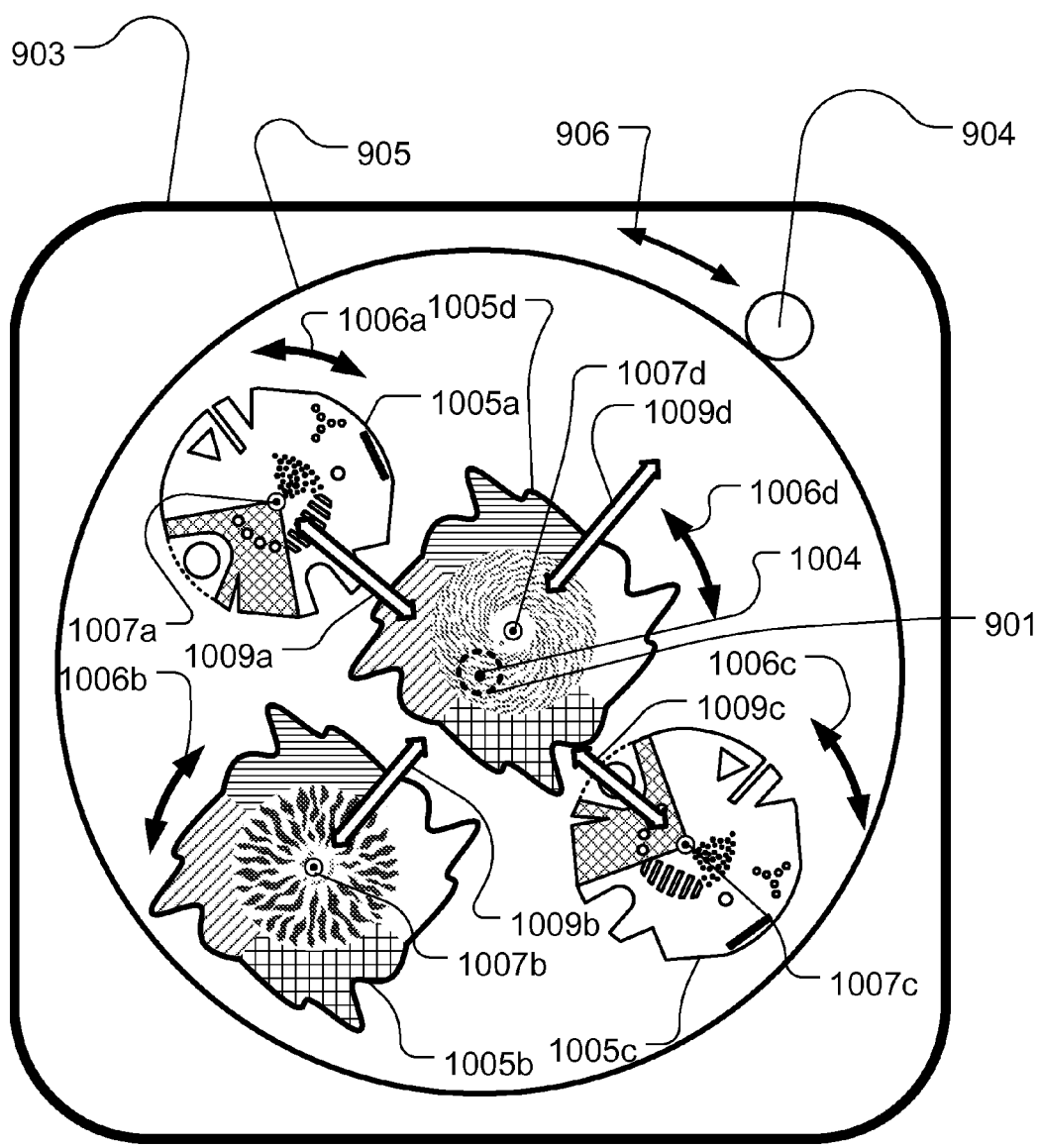

FIG. 10 illustrates a light effect system for forming a light beam 901 according to the present invention. The light effect system comprises a base support 903 rotatable supporting a light effect support 905. The light effect support can be rotated in relation the base support as indicated by arrow 906. For instance by using a gear connection 904 connected to an actuator. The light effect support comprises four light forming means 1005a, 1005b, 1005c and 1005d adapted to form the light beam. Each light forming means can by a rotation actuator (not shown) be rotated as illustrated by arrow 1006a, 1006b, 1006c and 1006d around a rotational point 1007a, 1007b, 1007c and 1007d and around an axis substantially parallel to the central axis 1004 the light beam 901. Each light forming means can by a displacement actuator (not illustrated) be moved in and out of the light beam as indicated by arrow 1009a, 1009b, 1009c and 1009d and will when positioned inside the light beam modify/form the light beam. Each displacement actuator is adapted to move the rotational point 1007a, 1007b, 1007c and 1007d in an area outside the light beam and radially to the central axis 1004 of said light beam. The light forming means are arranged in pairs where the rotational point of two light forming means are positioned on opposite sides of the light beam. Light forming means 1005a and 1005c constitute thus a first pair and light forming 1005b and 1005d constitute a second pair. The first and second pair are further arranged perpendicular to each other. The light effect system comprises rotatable electric connecting means as describe in connection with the framing system of FIG. 1-7. The rotatable electric connecting enabling transferring of electric energy between said light effect support and said base support during rotation of said light effect support in relation to said base support. The actuators rotating and moving the light forming means can thus receive both power and control signals during rotation of the light effect support. The light forming means can thus be rotated inside the light and further be rotated around the light beam which creates new and innovative light effects. The light forming means arranged on the light effect support can further be embodied as described in the Danish patent application titled "LIGHT EFFECT MODULE FOR FORMING A LIGHT BEAM" by inventor Claus Ellevang Hansen and filed the 10$^{th}$ of Sep. 2010 by the applicant Martin professional A/S incorporated herein by reference.

Figure 11:
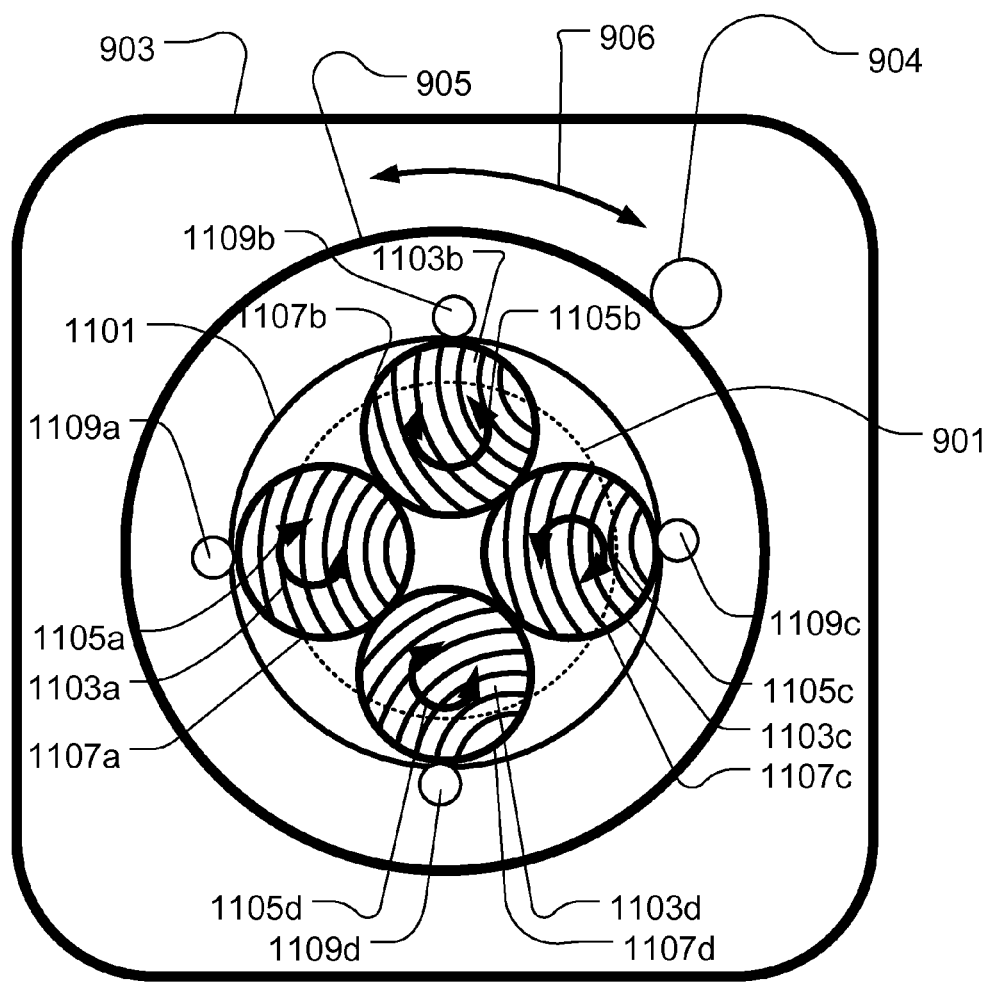

FIG. 11 illustrates a light effect system for forming a light beam 901 according to the present invention. The light effect system comprises a base support 903 rotatable supporting a light effect support 905. The light effect support can be rotated in relation the base support as indicated by arrow 906 for instance by using a gear connection 904 connected to an actuator. The light effect support 905 comprises a light beam diffractor 1101 comprises four diffractor sections 1103a-d which can be rotated (illustrated by arrows 1105a-1105b) in relation to the light beam 901 by four actuators (not illustrated). The actuators can be controlled independently of each other and the four diffractor sections can thus also be rotated independently of each other. The diffractor sections is adapted to diffract at least a part of said light beam and the for diffractor sections can create four independently controlled light beams when they are positioned in the light beam. The diffractor sections 1103a-d can be embodied as circular cut-outs of a Fresnel lens. The diffractor sections is here mounted in bearings 1107a-d and the outer perimeter of the bearings are adapted to interact with the actuators e.g. through a gear mechanism 1109a-d. The bearings provides a smooth rotation and reduces wear. In this embodiment the light beam is optimized such that the amount of light hitting the four diffractor sections are as large as possible. The light effect system comprises rotatable electric connecting means as describe in connection with the framing system of FIG. 1-7. The rotatable electric connecting enabling transferring of electric energy between the light effect support and the base support during rotation of said light effect support in relation to the base support. The light forming means can thus be rotated inside the light beam and further be rotated around the light beam which creates new and innovative light effects. The four individual controllable light beams can thus also be rotated around the central axis of the light beam. The diffractor sections arranged on the light effect support can further be embodied as described in the Danish patent application titled "ILLUMINATION DEVICE WITH SPLIT BEAM EFFECT" by inventor Peter Skytte Christoffersen and filed the 10$^{th}$ of Sep. 2010 by the applicant Martin professional A/S incorporated herein by reference.

The invention claimed is:
1. A light effect system for forming a light beam, said light effect system comprising a base support rotatably supporting a light effect support,
said light effect support comprising:
a light former, said light former adapted to form at least a part of said light beam; and
at least one actuator adapted to move said light former in relation to said light beam;
said base support comprising:
a first support plate rotatably carrying said light effect support; and
a second support plate separate from and connected to said first support plate, said second support plate comprising at least one electric conducting track surrounding said light beam;
wherein said light effect support includes at least one contact, said at least one contact in connection with said electric conducting track, moving along said electric conducting track when said light effect support rotates in relation to said base support.

2. The light effect system according to claim 1, wherein said at least one electric conducting track, surrounding said light beam, lies on a plane perpendicular to said light beam, parallel to a plane of said second support plate.

3. The light effect system according to claim 1, wherein said electrical conducting track is embodied on a printed circuit board secured to said second support plate.

4. The light effect system according to claim 1, wherein said at least one contact comprises a tensioner that biases said contact towards said at least one electric conducting track.

5. The light effect system according to claim 1, wherein said light effect support is positioned between said first support plate and said second support plate.

6. The light effect system according to claim claims 1, wherein said at least one contact and at least one electric conducting track transfer at least one power signal between said second support plate and said light effect support.

7. The light effect system according to claim 1, wherein said at least one contact and at least one electric conducting track transfer at least one control signal between said second support plate and said light effect support.

8. The light effect system according to claim 1, wherein
said light former comprises a number of shutter blades surrounding said light beam; and
said at least one actuator is adapted to move said shutter blades in and out of said light beam.

9. The light effect system according to claim 1, wherein
at least a first actuator is adapted to rotate said light former around a first rotational point and around an axis substantially parallel to the central axis of said light beam;
at least a second actuator is adapted to move said first rotational point in an area outside said light beam and radially to the central axis of said light beam.

10. The light effect system according to claim 1, wherein
said light former comprises one light beam diffractor, said light beam diffractor positioned at least partially in said light beam; said light beam diffractor adapted to diffract at least a part of said light beam; said light beam diffractor comprises a first diffractor section diffracting a first part of said light beam and a second diffractor section diffracting a second part of said light beam; and
a first actuator adapted to move said first diffractor section in relation to said light beam, and a second actuator adapted to move said second diffractor section in relation to said light beam, where said first actuator and said second actuator is independently controlled by at least one processor.

11. A light fixture comprising a light source generating a light beam wherein said light fixture comprises a light effect system according to claim 1.

12. The light fixture according to claim 11, wherein said light source and said light effect system are positioned in a head, said head being rotatable relative to a yoke, said yoke being rotatable relative to a base.

13. A method for forming a light beam using a light effect system, said light effect system comprising a base support rotatably supporting a light effect support,
said light effect support comprising:
a light former, said light former adapted to form at least a part of said light beam; and
at least one actuator adapted to move said light former in relation to said light beam;
said base support comprising:
a first support plate rotatably carrying said light effect support; and
a second support plate separate from and connected to said first support plate, said second support plate comprising at least one electric conducting track surrounding said light beam;
wherein said light effect support includes at least one contact, said at least one contact in connection with said electric conducting track, moving along said electric conducting track when said light effect support rotates in relation to said base support;
said method comprising the steps of:
moving said light former using said actuator; and
rotating said light former in relation to said light beam by rotating said light effect support;
wherein said step of rotating said light former in relation to said light beam comprises the steps of:
rotating said light effect support at least 360 degrees; and
transferring electric energy between said light effect support and said second support plate.

14. A light effect system for forming a light beam, said light effect system comprising a base support rotatably supporting a light effect support:
said light effect support comprising:
a light former, said light former adapted to form at least a part of said light beam; and
at least one actuator adapted to move said light former in relation to said light beam;
said base support comprising at least one electric conducting track extending around said light beam, said at least one electric conducting track lies on a plane parallel to a plane of the base support and perpendicular to a plane of said light beam;
wherein said light effect support includes at least one contact, said at least one contact in connection with said at least one electric conducting track, moving along said at least one electric conducting track, around said light beam, when said light effect support rotates in relation to said base support;
wherein said at least one contact comprises a tensioner that biases said at least one contact towards said at least one electric conducting track, in a direction parallel with said light beam,
wherein said at least one contact and said at least one electric conducting track transfer electric energy between said light effect support and said base support during rotation of said light effect support in relation to said base support.

15. The light effect system according to claim 14, wherein said at least one contact and at least one electric conducting track transfer at least one power signal between said base support and said light effect support.

16. The light effect system according to claim 14, wherein said at least one contact and at least one electric conducting track transfer at least one control signal between said base support and said light effect support.

* * * * *